United States Patent [19]

Foster et al.

[11] 4,445,424

[45] May 1, 1984

[54] ACTUATOR HAVING BELLEVILLE WASHER CONFIGURATION OPERATING IN CONCERT WITH A PISTON CYLINDER MEMBER

[75] Inventors: Stephen R. Foster, Gretna; Peter W. Austin, New Orleans, both of La.

[73] Assignee: Baker Cac, Inc., Belle Chase, La.

[21] Appl. No.: 307,713

[22] Filed: Oct. 2, 1981

[51] Int. Cl.³ ............................................ F01B 31/12
[52] U.S. Cl. ..................................... 92/5 R; 92/108; 92/130 B; 137/556; 251/63.6
[58] Field of Search ............ 92/130 B, 130 C, 130 D, 92/130 R, 5 R, 5 L, 108, 1; 251/63.6, 63.5; 137/556

[56] References Cited

U.S. PATENT DOCUMENTS

| | | | |
|---|---|---|---|
| 2,179,153 | 11/1939 | Jones | 92/130 B |
| 3,029,060 | 4/1962 | Anderson | 92/130 C |
| 3,065,949 | 11/1962 | DeFrees | 92/130 R |

FOREIGN PATENT DOCUMENTS 1076885 4/1954 France ............................ 92/130 B

*Primary Examiner*—Paul E. Maslousky
*Attorney, Agent, or Firm*—Norvell & Associates

[57] ABSTRACT

A pressure actuator is provided for a valve having a housing and an actuating stem, wherein an annular housing is attachable at one end of the valve housing and a cylindrical piston element is concentrically fixedly mounted to the other end of the annular housing. A cup-shaped cylinder is provided to cooperate in sliding and sealing relationship with the exterior of the piston. The cylinder defines an annular space between its exterior surface and the interior bore of the annular housing and spring elements are mounted in the annular space. If desired, an indicating stem passes through a bore in the fixed piston element and is interiorly engaged with the movable cylinder element, thus providing an indicating actuator wherein the total length of the actuator is not substantially in excess of twice the stroke of the actuator.

1 Claim, 4 Drawing Figures

ACTUATOR HAVING BELLEVILLE WASHER CONFIGURATION OPERATING IN CONCERT WITH A PISTON CYLINDER MEMBER

BACKGROUND OF THE INVENTION

1. Field of the Invention

The invention relates to a fluid pressure actuator of the type employed to effect movement of the operating stem of a valve relative to the valve housing, wherein the fluid pressure induced movement of the actuator is opposed by a spring, such as a stack of Belleville spring washers.

2. Description of the Prior Art

There are numerous fluid pressure actuators for valves that have been heretofore proposed. In substantially all cases, the fluid pressure actuator comprises a piston mounted on a shaft, which in turn is connected with the valve stem. Such piston cooperates with the interior walls of cylinder and the fluid pressure produced movements of the piston relative to the cylinder are opposed by a spring. In oil field operations, for example, it is desirable to employ Belleville springs to produce a very rapid increase in opposing spring force as a function of displacement of the piston. However, as is well known, Belleville type springs cannot be positioned where the edge of the spring can contact either the bearing or sealing surfaces of the cylinder or the piston shaft, because of the tendency of the spring edges to gouge or mar any surfaces which are disposed in closely surrounding relationship. It has therefore been necessary to provide special spring enclosures for fluid pressure actuators employing Belleville springs.

The total height or axial length of an actuator is also of concern. If the piston is to be moved through a distance by the fluid pressure, the stroke of the piston will be S and the axial length dimension of the actuator will generally be somewhat in excess of 2S, because of the length necessary to accomodate the solid height of the return spring under the piston in its lowermost position. If the further requirement that an indicating stem be provided on one end of the piston projecting out of the cylinder to provide an indication of whether the valve is in its pressure actuated position or in its spring biased position, the overall axial length of the actuator is increased to approximately 3S. It is therefore desirable to provide an actuator, including an indicating stem, wherein the total axial length of the actuator is not substantially in excess of two times the stroke of the piston.

SUMMARY OF THE INVENTION

This invention provides a fluid pressure actuator for a valve of the type having a stationary housing and a movable actuating stem, wherein the piston element of the actuator is defined by an inwardly projecting part of an end wall of a stationary housing which is appropriately secured to the valve housing. The cylinder is defined by an axially movable, cup-shaped member which cooperates with the external cylindrical surface of the stationary piston and is operatively connected to the valve stem. The cylinder motion is opposed by a stack of Belleville spring washers which are mounted in an annular space defined between the interior wall of the actuator housing and the exterior wall of the cup-shaped cylinder. The result is that an extremely compact structure is produced which is fully effective to provide a high degree of spring resistance to fluid pressure induced movement of the actuator, while at the same time providing adequate encasement of the Belleville spring washers and isolating such from contact with any bearing or sealing surface.

If an indicating stem is required, such stem may comprise a rod-like member which is slidably and sealably mounted within a bore formed in the stationary piston, and is suitably secured to the movable cylinder. The indicating stem is thus substantially axially coincident with the movable cylinder, hence the overall height or axial length of the actuator is just slightly greater than two times the stroke of the movable cylinder.

DESCRIPTION OF THE PREFERRED EMBODIMENTS

Figure 1:
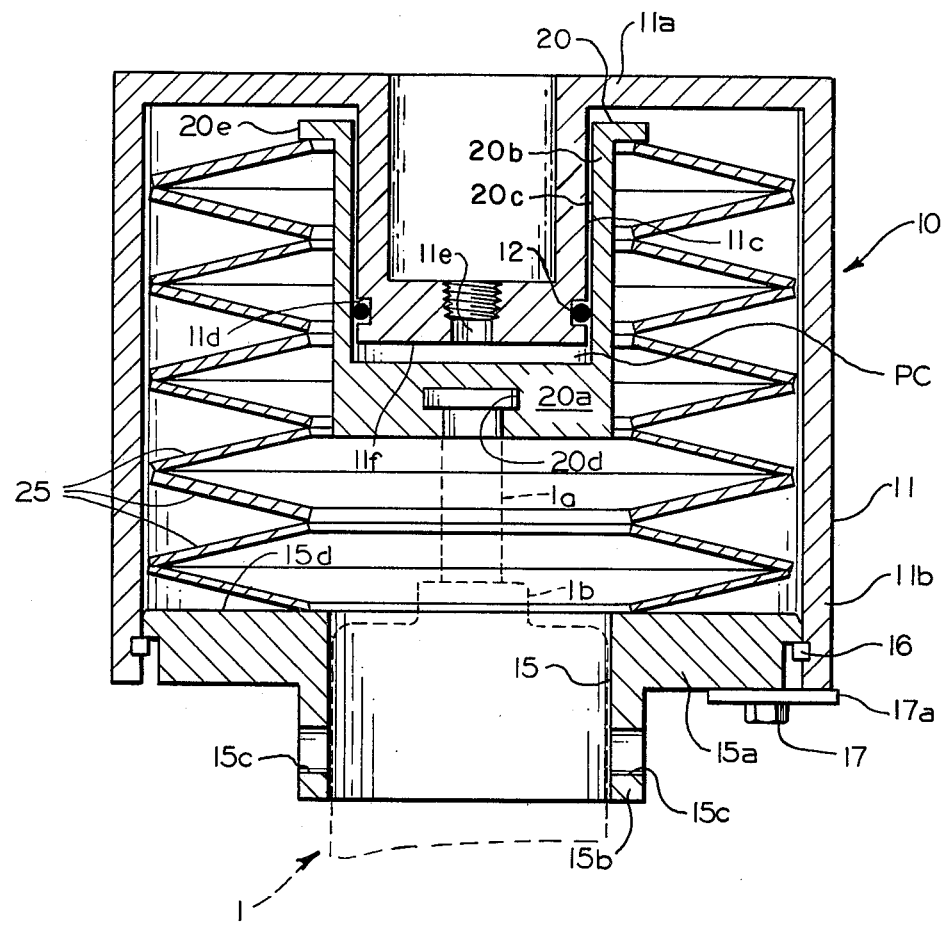
FIG. 1 is a schematic vertical sectional view of a fluid pressure actuator embodying this invention, showing the elements thereof in their inactive position.
Figure 2:
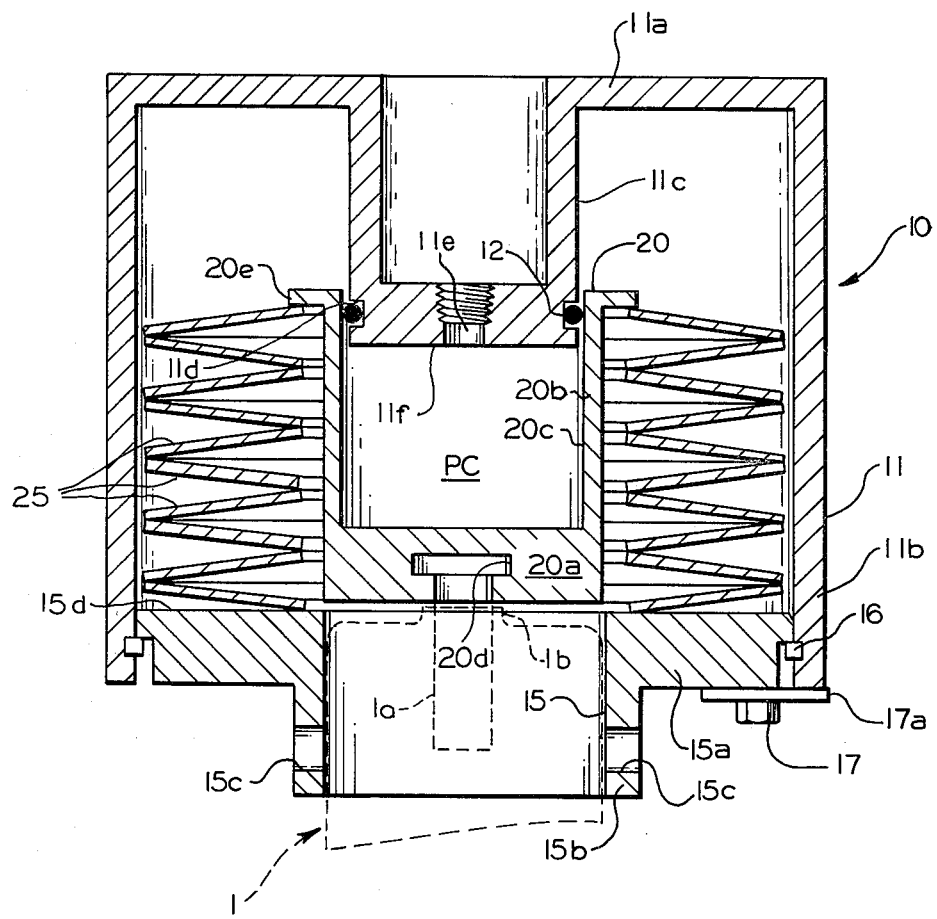
FIG. 2 is a view similar to FIG. 1 showing the elements of the actuator in their positions when fluid pressure is applied to the actuator.

In FIGS. 1 and 2, numeral 10 refers generally to a pressure actuator embodying the invention which is employed to effect the displacement of an operating stem 1a of a valve unit 1 having a stationary housing 1b. The construction of such valve unit forms no part of the invention and, hence, is only schematically indicated in the drawings.

Actuator 10 comprises a stationary cup-shaped annular housing 11 having cylindrical wall portions 11b and a closed bottom end portion 11a. Wall portions 11b mount an annular connecting element 15 having a radial flange portion 15a which is trapped behind a C-spring 16, which is snapped into an appropriate groove in the outer open end of the cup-shaped housing 11. Bolts 17 and enlarged washers complete the securement of connecting element 15 to housing 11. Annular connecting element 15 is also provided with an axially extending sleeve portion 15b which surrounds the bonnet of the valve 1 and is secured thereto by a plurality of bolts (not shown) passing through radial holes 15c provided in the sleeve portion 15b.

An integral upstanding piston portion 11c is formed on the base portion 11a of the cup-shaped outer housing 11. Piston portion 11c is provided near its outer extremity with an appropriate groove 11d which receives a dynamic O-ring seal 12.

A generally cup-shaped cylinder 20 is provided having a solid base portion 20a and cylindrical wall portion 20b. The interior surface 20c of wall portion 20b is slidably and sealingly engaged with the dynamic seal 12 and, thus, a fluid pressure chamber PC is formed between the end face 11f of the stationary piston 11c and the base portion 20a of the cup-shaped cylinder 20. Pressured fluid is supplied to the pressure chamber PC through an axial passage 11e provided in the fixed piston portion 11c. Accordingly, when pressured fluid is introduced through the passage 11e, the cup-shaped cylinder 20 is urged axially toward the opened end of the cup-shaped housing 11.

Appropriate means are provided for connecting the actuating stem 1a of the valve 1 to the cylinder 20. For example, a T-shaped slot 20d may be formed in the base portion 20a of the cylinder 20 to engage a correspondingly shaped head on the actuating stem 1a of the valve 1. Thus, the actuating stem 1a is axially shiftable with movements of the cylinder 20.

To resiliently oppose the fluid pressure induced movement of the cylinder 20, a stack of Belleville spring washers 25 are mounted in the annular recess defined between the exterior walls of the cylinder 20 and the interior of the annular walls 11b of the cup-shaped outer housing 11. The open end of the cylinder 20 is provided with a radially outwardly projecting flange portion 20e which forms one seat for the stack of Belleville washers 25. The other end of the stack of washers 25 is retained by their engagement with the inner surface 15d of the radial flange portion 15a of the connecting element 15.

FIG. 1 shows the elements of the actuator in their position when no fluid pressure is applied to the pressure chamber PC. The cylinder 20 is disposed with its open end closely adjacent to the closed end 11a of the outer housing 11.

Referring to FIG. 2, when a pressured fluid is supplied to the pressure chamber PC, the cylinder 20 is moved towards the opened end of the outer housing 11, thus moving the valve stem 1a relative to the valve housing 1, and causing actuation of the valve. This results in a compression of the stack 25 of Belleville spring washers and it will be noted that in their compressed condition, the Belleville washers are internally restrained by the external walls of the cylinder 20. In their unloaded condition (FIG. 1), the Belleville washers are externally restrained by the inner surface of the wall 11b of the outer housing 11. Thus, any cocking or distortion of the stack of spring washers under the loading produced through the application of fluid pressure to the chamber PC is substantially eliminated, and all bearing or sealing surfaces of the actuator are protected from contact with the Belleville washers.

Figure 3:
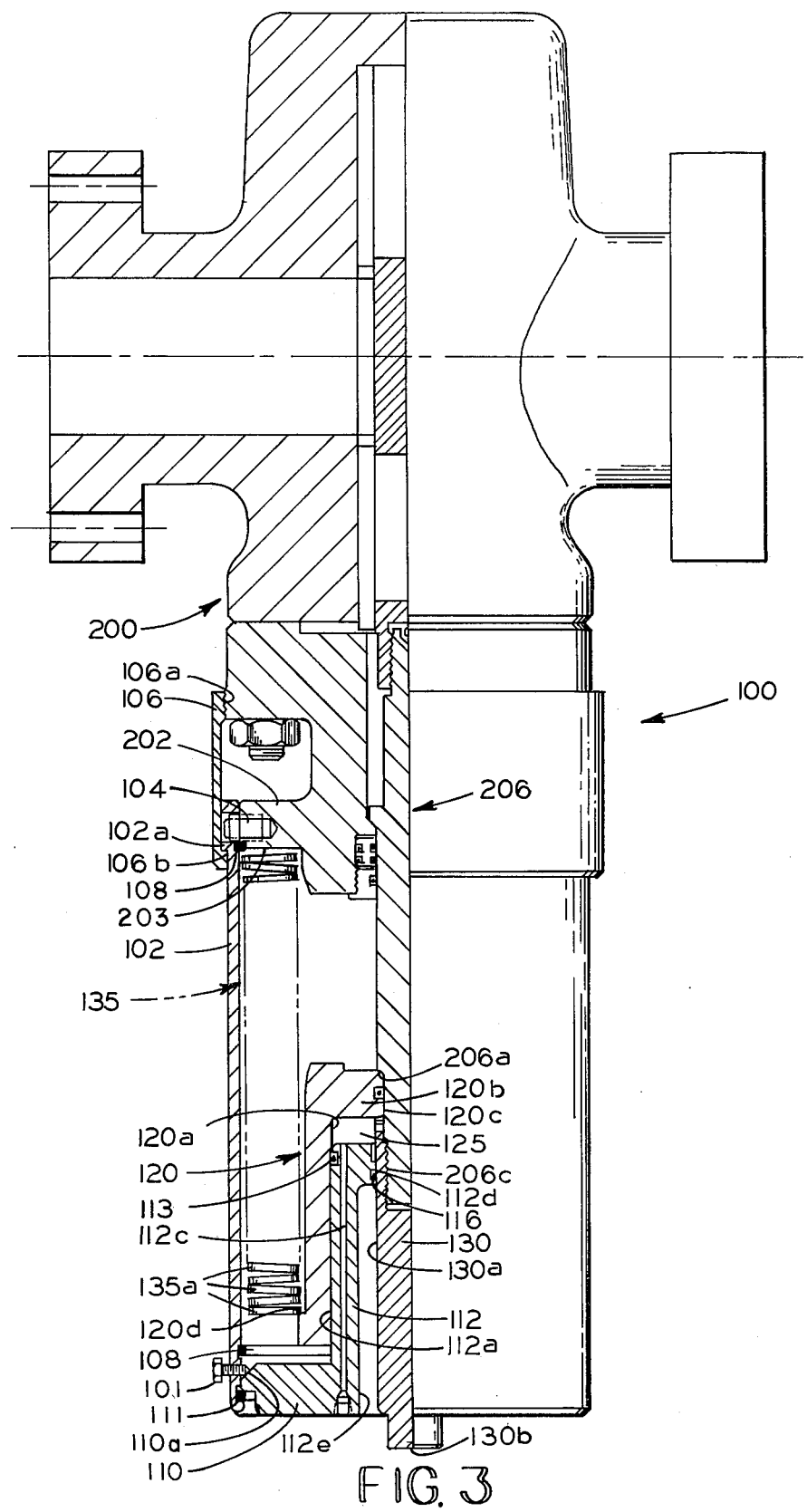
FIG. 3 is a vertical sectional view of a modified form of fluid pressure actuator embodying this invention and including an indicating stem, and showing the elements thereof in their inactive positon.
Figure 4:
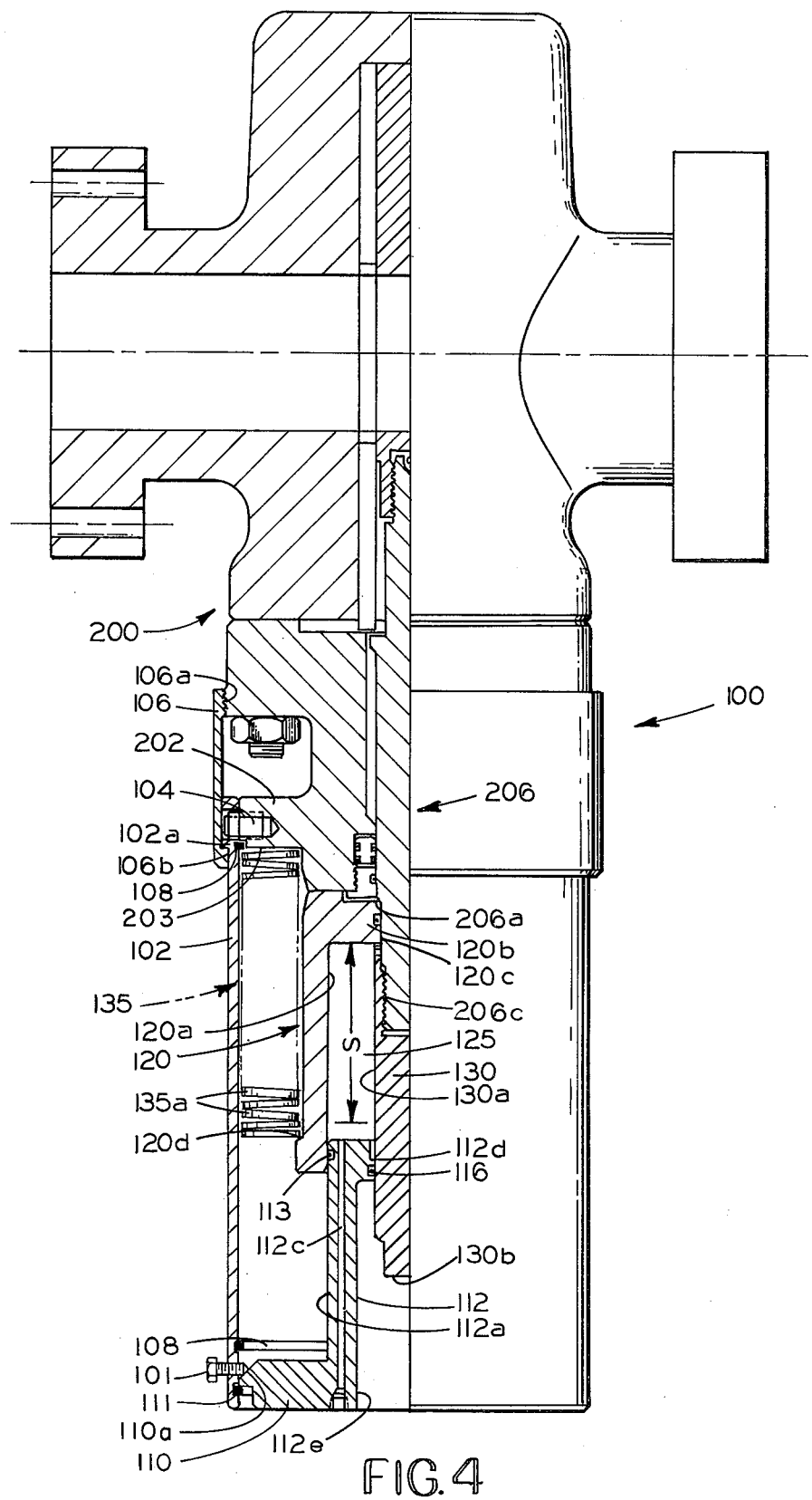
FIG. 4 is a view similar to FIG. 3 showing the elements of the actuator in their positions when fluid pressure is applied to the actuator.

Referring now to FIGS. 3 and 4, there is shown a further embodiment of this invention wherein the improved actuator is of minimal overall length and is provided with an indicating stem. Actuator 100 comprises an external housing sleeve 102 having a radially thickened end portion 102a which is traversed by a set screw 104 which extends into the bonnet portion 202 of a valve housing 200. Housing sleeve 102 is primarily secured to the bonnet 202 by a retaining sleeve 106 which has internal threads 106a engaging a threaded portion of the bonnet 202 and an internally projecting shoulder portion 106b engaging the shoulder defined by the thickened portion 102a of the housing sleeve 102. The set screw 104 may be replaced by bolting means if it is desirable to eliminate the housing sleeve 102 for any particular valve application.

The opposite ends of housing sleeve 102 are each provided with annular grooves for respectively receiving a pair of retaining C-rings 108. C-rings 108 are respectively disposed on opposite sides of the Belleville washer stack and effectively contain the stack when the housing sleeve 102 is removed from the valve bonnet 202 during actuator disassembly for servicing, installation or removal. End wall element 110 is effectively secured to the housing sleeve 102 by a set of radially projecting bolts 101 which are threaded through the housing sleeve 102 and engage inclined surface 110a of the end element 110 forcing it outwardly along the axis of the actuator to engage a third retaining C-ring 111 located immediate thereto and within a groove in the lower end of the housing sleeve 102. The end wall element 110 is provided with an annular, inwardly projecting axial extension 112 which defines an external cylindrical piston surface 112a.

A generally cup-shaped movable cylinder element 120 is provided having an internal bore co-operable in sliding and sealing relationship with the cylindrical piston surface 112a. A conventional seal 113 is provided in the inner end of the piston surface 112a to effect the sealing relationship with the cylinder bore surface 120a. The end wall 120b of the cup-shaped cylinder 120 is provided with a central bore 120c which permits the cylinder element 120 to be mounted on the stem 206 of the valve contained within the valve housing 200 and valve bonnet 202. Such valve is entirely conventional and forms no part of this invention and hence will not be further described.

The outer face of the end wall 120b of the cup-shaped cylinder 120 abuts against a radial shoulder 206a provided on the valve stem 206 and thus transmits fluid pressure induced forces to such valve stem. The outer end of valve stem 206 is threaded as indicated at 206c and these threads co-operate with internal threads provided on a valve position indicating stem 130. The external cylindrical surface 130a of stem 130 passes through the bore 112d defined in the inner end of the annular inward extension 112. A seal 116 is mounted in the bore 112d and provides the sealing engagement with the indicating stem 130. It is therefore apparent that the co-operation of the indicating stem 130 with the seal 116 and the inner bore 120a with the seal defines a fluid pressure chamber 125 which can be selectively supplied with fluid pressure through a passage 112c defined in the annular extension 112.

The inner end wall of the cup-shaped cylinder 120 is radially thickened to provide a shoulder 120d, on which a compressible spring element 135 may be seated. Preferably, the spring element comprises a stack of Belleville washers 135a. The other end of said stack abuts against a radial end surface 203 provided on the housing bonnet 202. It will therefore be apparent that the spring 135 is confined between two cylindrical surfaces, neither of which constitute a bearing or sealing surface of the assembly.

When no fluid pressure is applied to the chamber 125, the position of the aforedescribed elements is as shown in FIG. 3 and the spring 135 is fully extended. Upon the application of pressurized fluid to the pressure chamber 125, the elements of the device move to the position shown in FIG. 4 wherein the actuating stem 206 of the valve is moved axially to open or close the valve, as the case may be, a distance equal to the travel of the moving cylinder 120 which is indicated on FIG. 4 of the drawings as a stroke S. It is therefore apparent that the overall axial length of the described actuator is essentially only slightly in excess of 2S.

In the inactive position shown in FIG. 3, the outer end 130b of the indicating stem 130 projects only slightly beyond the end wall 110 of the actuator, thus providing a clear visual indication of the position of the valve at that point. When the actuator is supplied with fluid pressure to move the cylinder 120 to the position shown in FIG. 4, the indicating stem is withdrawn into the confines of the device, but the end thereof is still readily visible through the enlarged counterbore 112e provided in the axially inwardly projecting extension 112. Thus an indicating stem is provided without significantly increasing the axial length of the entire actuator beyond the minimum distance of approximately twice the stroke of the moving element of the actuator.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A fluid pressure actuator for a valve having a housing and an actuating stem comprising: an annular housing having one end attachable to the valve housing; a cylindrical piston element concentrically fixedly mounted in the other end of said annular housing and extending into the interior of said annular housing toward said one end; a cupshaped cylinder slidably and sealably mounted on the exterior of said cylindrical piston and defining an annular space between its exterior surface and an interior wall surface of said annular housing; a radially outwardly projecting flange on the open end of said cup-shaped cylinder; conduit means for supplying pressured fluid to the interior of said cylinder to urge same toward the valve housing; resilient means mounted in said annular space and engaging said flange to oppose the fluid pressure produced movement of said cylinder; means for connecting said cylinder to the actuating stem of the valve; said cylindrical piston element having a central bore, an indicating stem slidably and sealingly co-operating with said central bore, and means for connecting the inner end of said indicating stem for co-movement with said cup-shaped cylinder, the length of said indicating stem being only slightly greater than the depth of said piston bore.

* * * * *